United States Patent [19]

Walker

[11] 4,307,516
[45] Dec. 29, 1981

[54] DIRECTIONAL TWO-AXIS DIFFERENTIAL OPTICAL INCLINOMETER

[75] Inventor: Clifford G. Walker, Huntsville, Ala.

[73] Assignee: The United States of America as represented by the Secretary of the Army, Washington, D.C.

[21] Appl. No.: 119,274

[22] Filed: Feb. 7, 1980

[51] Int. Cl.³ .......................... G01C 9/06; G01C 9/24
[52] U.S. Cl. .................................................. 33/366
[58] Field of Search ............. 33/366, 377; 250/231 R, 250/577; 73/293, 516

[56] References Cited

U.S. PATENT DOCUMENTS

| | | | |
|---|---|---|---|
| 2,547,310 | 4/1951 | Flint | 33/377 X |
| 2,974,532 | 3/1961 | Goshen et al. | 33/377 X |
| 3,464,276 | 9/1969 | Liebert | 33/377 X |
| 3,741,656 | 6/1973 | Shapiro | 250/577 |
| 4,024,823 | 5/1977 | Ward et al. | 33/366 X |

Primary Examiner—Charles E. Phillips
Attorney, Agent, or Firm—Nathan Edelberg; Robert P. Gibson; James T. Deaton

[57] ABSTRACT

A directional two-axis differential optical inclinometer which includes light sources and optical detectors in two different systems for determining angle change in a test table and the direction of change from the horizontal plane.

5 Claims, 3 Drawing Figures

DIRECTIONAL TWO-AXIS DIFFERENTIAL OPTICAL INCLINOMETER

DEDICATORY CLAUSE

The invention described herein may be manufactured, used, and licensed by or for the Government for governmental purposes without the payment to me of any royalties thereon.

BACKGROUND OF THE INVENTION

In the past, devices for measuring tilt from the horizontal have included such things as the liquid bubble principle with visual indication only, the liquid bubble principle with an electrical output, or pendulum mass principle with an electrical output. These devices are not as accurate or as sensitive as desired in giving deviation of the device from the horizontal position when tilted vertically from the horizontal.

Therefore, it is an object of this invention to provide an optical inclinometer in which the output thereof is an accurate indication of the deviation of the device from horizontal.

Another object of this invention is to provide an inclinometer which has two different inputs that are compared in an indicator to produce a differential readout of the true position of the device relative to the horizontal plane.

Another object of this invention is to provide an inclinometer that utilizes optics and detectors that respond to light intensity to cause the detectors to provide outputs to an indicator.

Other objects and advantages of this invention would be obvious to those skilled in this art.

SUMMARY OF THE INVENTION

In accordance with this invention, a directional two-axis differential optical inclinometer is provided which includes a first optical inclinometer that utilizes a laser which produces a collimated light source which is transmitted through a transparent gas and reflected from the surface of an opaque liquid onto a detector that produces an output that is utilized in an indicator to indicate deviation of the device from the horizontal position, and a second optical inclinometer includes a diffusion light source that is used to provide light to four detectors for the diffused light with the detectors being mounted opposite each other in pairs and being exposed by the varying of the surface of the opaque liquid relative to the detectors to expose more or less of the detector surfaces as the tilt of the device varies. The four detectors produce outputs which are connected to an indicator which compares the outputs from the two systems and produces a differential readout.

DESCRIPTION OF THE PREFERRED EMBODIMENT

Figure 1:
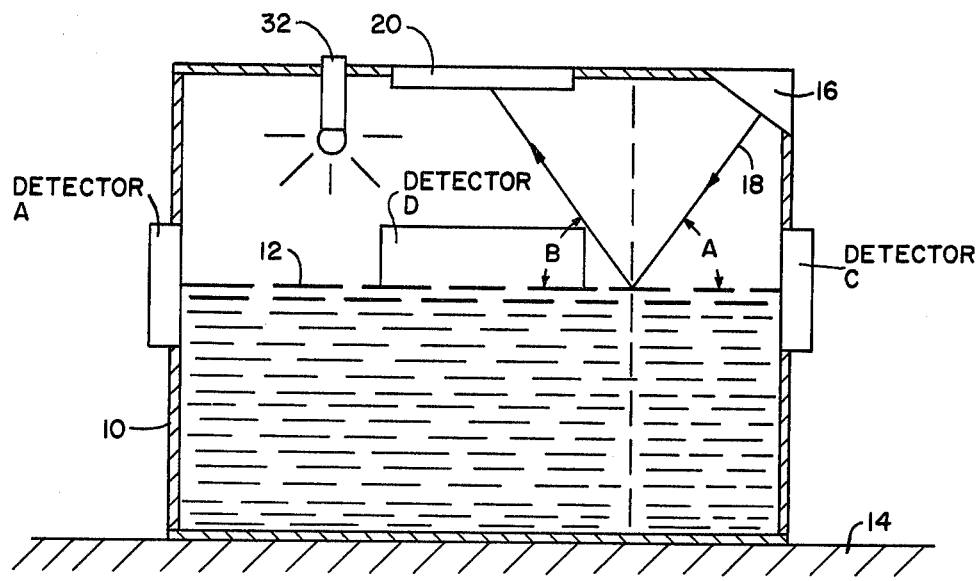
FIG. 1 is a schematic sectional view of a directional two-axis differential optical inclinometer in accordance with this invention.
Figure 2:
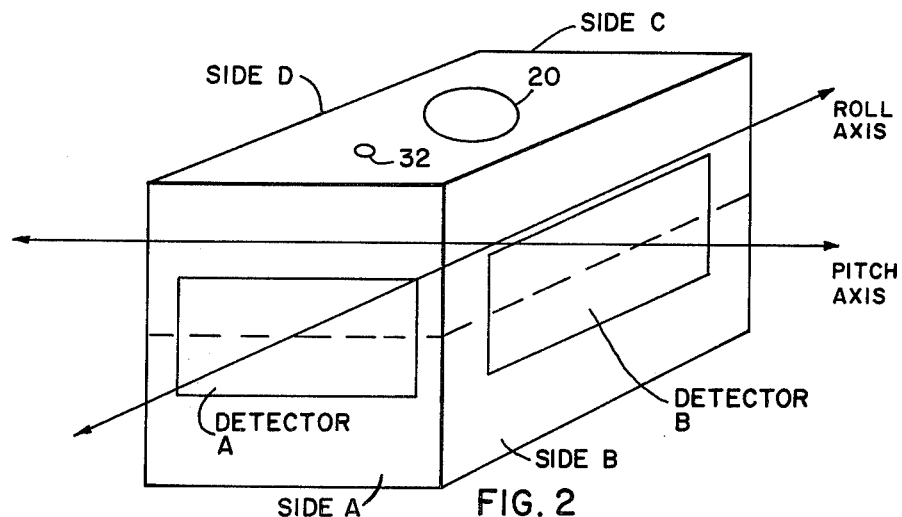
FIG. 2 is a schematic perspective view illustrating side detectors and directions of tilt of the inclinometer.
Figure 3:
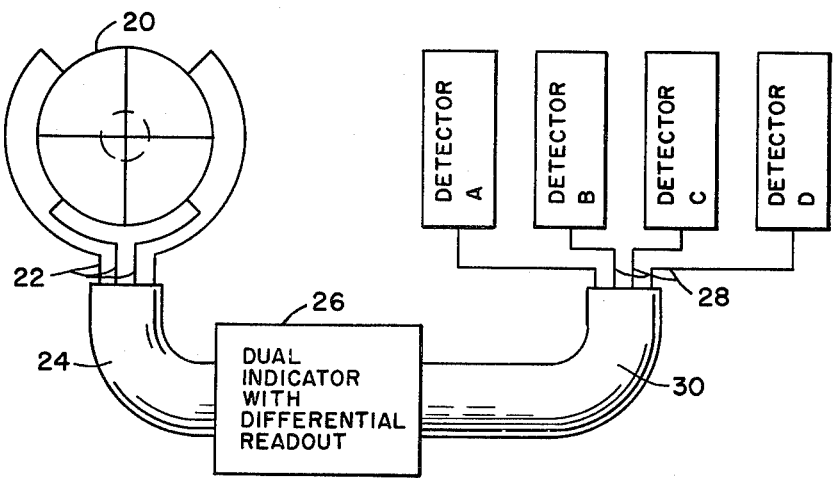
FIG. 3 is a schematic view illustrating the detectors and their inner connection to a dual indicator with differential readout.

Referring now to the drawing, the directional two-axis differential optical inclinometer includes a rectangular or square container 10 that has an opaque liquid 12, such as mercury, therein for reflecting light from the reflective surface of the liquid. A transparent gas, such as air, fills the space in container 10 above liquid 12. Container 10 is mounted on a table or platform 14 which can be tilted in two degrees of freedom, for example in roll and pitch axes, and the inclinometer is designed for detecting this roll and pitch in the two axes. Opaque liquid 12 should also have a low viscosity such as or similar to that of mercury in order for the liquid to respond quickly to movement in the roll and pitch axes. A light source 16 that emits collimated light is mounted on container 10 to direct light 18 toward the surface of liquid 12 at angle A and the surface of liquid 12 reflects light 18 therefrom at angle B depending upon the tilt of the liquid relative to container 10. The light reflected from surface 12 is projected onto detector 20 which can be a conventional silicon detector or a gallium arsenide detector that is divided into quadrants as illustrated in FIG. 3. The quadrants can be any desired number in multiples of four and the number used will depend upon the sensitivity desired of the output through leads 22 and cable 24 to an input of dual indicator 26.

Another correlating inclinometer system which allows a differential output to be obtained with the overall device includes container 10 having four detectors A, B, C and D mounted on four sides of container 10 as illustrated. Detectors A and C are identical and mounted opposite each other and parallel to each other. Detectors B and D are identical to detectors A and C and are mounted opposite each other and parallel to each other on walls of container 10 that are perpendicular to the walls of container 10 that mount detectors A and C. Detectors A, B, C and D can be silicon detectors or gallium arsenide detectors that respond to light to produce an output. These detectors are connected by leads 28 through cable 30 to another input of dual indicator 26. Outputs 22 and 28 from the detectors are either voltage or current indications with the voltage or current being proportional to the intensity of light energy received at its respective detector. That is, light source 32 can have a conventional light bulb as the source or a source such as a laser light diffused source. The light emanating from source 32 is received by the exposed surfaces of detectors A, B, C and D that are above the level of liquid 12 to cause outputs to be produced through leads 28. Outputs through leads 22 and 28 are processed by dual indicator 26 to produce a differential readout at dual indicator 26. Using the differential system, a more accurate readout of tilt in the roll and pitch axes is obtained.

In operation, with the device sitting at zero tilt angle, light from light source 32 strikes each of the four detectors A, B, C, D, with the intensity and coverage area. The resistance type photon detectors A, B, C, D change resistance in proportion to the change in exposed areas of the detectors that are above liquid level 12, and the more area exposed of each detector to light 32, the smaller the resistance of the respective detector. Detectors A and C can represent the pitch angle detectors, and at zero tilt angle each detector resistance is the same. If test table 14 pitches up less area of detector A is exposed to the light and the detector resistance will increase by R ohms. At the same time, detector C has the same area exposed more to light and the detector resistance decreases by R ohms. This differential resistance change is used to indicate the correct tilt angle. Pitch axis tilt does not effect the roll axis measurement because there is no net change in the light exposed area of the roll detectors. Likewise the same is true for roll input tilt angles relative to the roll axis. The signal from detectors A, B, C and D are transmitted by leads 28 through cable 30 to dual indicator 26 which compares these signals with those coming from detector 20. The signals produced at detector 20 are caused by light 18 from light source 16 striking the reflective liquid surface at an angle A. The light ray is reflected by angle B and strikes detector 20 with a light pattern similar to the dotted line as indicated in FIG. 3. If test table 14 tilts in any direction in the horizontal plane, angle A changes and moves the light pattern on detector 20 in the direction of the input tilt angle. This change is noted by outputs from detector 20 through leads 22 and cable 24 to dual indicator 26 which processes these signals as well as those from cable 30 to produce a differential readout which gives an accurate tilt angle measurement and direction of the tilt measurement. It is to be understood that each quadrant of detector 20 and each of detectors A, B, C and D have a conventional power supply connected thereacross so as to enable conventional outputs to be obtained for example through leads 22 of detector 20 and through leads 28 of detectors A, B, C and D. It is also understood that light sources 16 and 32 will have a conventional power source connected thereto.

I claim:

1. A directional two-axis differential optical inclinometer comprising a container having an opaque liquid therein partially filling said container, a light source for emitting collimated light toward a reflective surface of said opaque liquid and a quadrant detector mounted on said container and detecting light reflected from said reflective surface, said quadrant detector having outputs that are fed to a dual indicator, said container also having two pairs of optical detectors with one pair of said detectors being mounted perpendicular to the other pair of detectors and each pair of detectors being oppositely facing and parallel to each other with the liquid partially covering said each pair of detectors, a diffused light source mounted on said container and providing light to exposed surfaces of said two pairs of optical detectors that are above the level of opaque liquid, and each of said detectors of said two pairs of detectors having an output that is connected to said dual indicator where a differential readout is produced which is indicative of tilt of said incinometer.

2. A directional two-axis differential optical inclinometer as set forth in claim 1, wherein said collimated light source is a laser light source and said quadrant detector is a silicon or gallium arsenide detector.

3. A directional two-axis differential optical inclinometer as set forth in claim 1, wherein said opaque liquid is mercury.

4. A directional two-axis differential optical inclinometer as set forth in claim 1, wherein said diffused light source is a laser source and said two pairs of optical detectors are silicon or gallium arsenide detectors.

5. A directional two-axis differential optical inclinometer as set forth in claim 1, wherein said collimated light source is a laser light source, said quadrant detector is a silicon or gallium arsenide detector, said diffused light source is a laser source and said two pairs of optical detectors are silicon or gallium arsenide detectors.

* * * * *